United States Patent
Shin et al.

(10) Patent No.: US 10,415,696 B2
(45) Date of Patent: Sep. 17, 2019

(54) HYDRAULIC CONTROL SYSTEM OF SHIFT CONTROL UNIT FOR DUAL CLUTCH TRANSMISSION

(71) Applicants: Hyundai Motor Company, Seoul (KR); Kia Motors Corporation, Seoul (KR)

(72) Inventors: Yong Uk Shin, Suwon-si (KR); Minho Chae, Incheon (KR); Chon Ok Kim, Yongin-si (KR); Sun Sung Kwon, Anyang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 9 days.

(21) Appl. No.: 15/961,716

(22) Filed: Apr. 24, 2018

(65) Prior Publication Data
US 2019/0128405 A1    May 2, 2019

(51) Int. Cl.
*F16H 61/4008* (2010.01)
*F16H 61/4035* (2010.01)
*F16H 61/00* (2006.01)
*F16H 61/28* (2006.01)
*F16H 63/34* (2006.01)
(Continued)

(52) U.S. Cl.
CPC ..... *F16H 61/0009* (2013.01); *F16H 61/0025* (2013.01); *F16H 61/2807* (2013.01); *F16H 61/4008* (2013.01); *F16H 63/3475* (2013.01); *F16H 61/688* (2013.01); *F16H 2061/6614* (2013.01); *F16H 2063/025* (2013.01); *F16H 2200/0065* (2013.01)

(58) Field of Classification Search
CPC .................. F16H 61/4008; F16H 61/4035
See application file for complete search history.

(56) References Cited

U.S. PATENT DOCUMENTS

| 4,655,330 | A | * | 4/1987 | Nishikawa | F16H 61/14 192/3.3 |
| 5,342,253 | A | * | 8/1994 | Mizobe | F16H 61/065 475/120 |

(Continued)

FOREIGN PATENT DOCUMENTS

KR    10-0534802 B1    12/2005

*Primary Examiner* — Tisha D Lewis
(74) *Attorney, Agent, or Firm* — Morgan, Lewis & Bockius LLP

(57) ABSTRACT

A hydraulic control system may include control valve to selectively supply line pressure to first and second ejection flow channels, first shift valve converting flow channel, second shift valve converting path to selectively supply hydraulic pressure of the first ejection path to first chambers of first and second actuators and to selectively supply hydraulic pressure of the second ejection path to second chambers of the first and second actuators, third shift valve converting path to selectively supply hydraulic pressure of the first ejection path to first chamber of third actuator and to selectively supply hydraulic pressure of the second ejection path to second chamber of third actuator, and fourth shift valve converting path to selectively supply hydraulic pressure of the first ejection path to first chambers of fourth and fifth actuators and to selectively supply hydraulic pressure of the second ejection path to second chambers of fourth and fifth actuators.

20 Claims, 10 Drawing Sheets

(51) Int. Cl.
   *F16H 61/688* (2006.01)
   *F16H 61/66* (2006.01)
   *F16H 63/02* (2006.01)

(56) References Cited

U.S. PATENT DOCUMENTS

| | | | | |
|---|---|---|---|---|
| 5,399,131 | A | * | 3/1995 | Kamada ................ F16H 61/061 |
| | | | | 477/150 |
| 5,409,427 | A | * | 4/1995 | Mori ........................ F16H 3/64 |
| | | | | 475/120 |
| 5,487,708 | A | * | 1/1996 | Marusue ............. F16H 61/0206 |
| | | | | 475/116 |
| 5,507,706 | A | * | 4/1996 | Jang .................... F16H 61/0206 |
| | | | | 477/126 |
| 5,839,988 | A | * | 11/1998 | Marusue ................ F16H 61/06 |
| | | | | 477/130 |
| 5,921,888 | A | * | 7/1999 | Park ................... F16H 61/0206 |
| | | | | 477/131 |
| 6,874,381 | B2 | | 4/2005 | Berger et al. |
| 8,206,265 | B2 | | 6/2012 | Maten et al. |
| 8,434,603 | B2 | | 5/2013 | Lundberg et al. |
| 8,475,336 | B2 | | 7/2013 | Whitmarsh et al. |

* cited by examiner

HYDRAULIC CONTROL SYSTEM OF SHIFT CONTROL UNIT FOR DUAL CLUTCH TRANSMISSION

CROSS-REFERENCE TO RELATED APPLICATION

The present application claims priority to Korean Patent Application No. 10-2017-0142176 filed on Oct. 30, 2017, the entire contents of which is incorporated herein for all purposes by this reference.

BACKGROUND OF THE INVENTION

Field of the Invention

The present invention relates to a hydraulic control system of a shift control device configured for a dual clutch transmission. More particularly, the present invention relates to a hydraulic control system of a shift control device configured for a dual clutch transmission by commonly using shift valves associated with shift to minimize a number of the shift valves, reducing a production cost and being applied to multiple-stages transmission of nine forward speeds or more.

Description of Related Art

Recently, as oil price has increased and exhaust gas emission regulations, or the like, have gradually been strengthened in the world, auto-makers are going-all out to develop a technology capable of improving fuel efficiency by an eco-friendly method.

An electric vehicle (EV) or a hybrid electric vehicle (HEV) that utilizes electrical energy, or a double clutch transmission (DCT) improving efficiency and convenience of a transmission may be examples of such a future vehicle technology.

The double clutch transmission (DCT) may include two clutches devices and a gear train of a basically manual transmission, selectively transmits a torque input from an engine to two input shafts by use of the two clutch devices, and outputs a torque shifted by the gear train.

Such a double clutch transmission (DCT) attempts to compactly realize a multi-stage transmission of more than five speeds, and the DCT achieves an automated manual transmission (AMT) that unnecessitates a manual shifting of a driver, by controlling two clutches and synchronizers by a controller.

In comparison with an automatic transmission using planetary gears, such a DCT shows merits, such as higher efficiency in power delivery, easier modification in revising or adding parts to achieve more shifting stages, etc., and thus gathers more spotlight since it can more comfortably conform with fuel consumption regulation and efficiency in achieving more shifting stages.

Also, for the enhancement of the fuel consumption and the high performance in the DCT, recently, high multi-stage transmission of eight speed stages or nine speed stages has been generated, and the development of the hydraulic control system configured for effectively controlling the actuator of the synchronizer applied to the high multi-stage transmission is progressing steadily.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a hydraulic control system of a shift control device for a dual clutch transmission by commonly using shift valves associated with shift to minimize a number of the shift valves, reducing a production cost and being applied to multiple-stages transmission of nine forward speeds or more.

A hydraulic control system of a shift control device for a dual clutch transmission according to an exemplary embodiment of the present invention may include a control valve variably controlling a line pressure supplied through a line pressure flow channel to be selectively supplied to a first ejection flow channel and a second ejection flow channel; a first shift valve converting a flow channel to supply a hydraulic pressure of the control valve supplied through the first and second ejection flow channels to a lower stream side through two paths, respectively; a second shift valve converting a flow channel to selectively supply the hydraulic pressure of the first ejection flow channel supplied from the first shift valve to a first chamber of a first actuator and a first chamber of a second actuator and to selectively supply the hydraulic pressure of the second ejection flow channel supplied from the first shift valve to a second chamber of the first actuator and a second chamber of the second actuator; a third shift valve converting a flow channel to selectively supply the hydraulic pressure of the first ejection flow channel supplied from the first shift valve to a lower stream side and a first chamber of a third actuator and to selectively supply the hydraulic pressure of the second ejection flow channel supplied from the first shift valve to a lower stream side and a second chamber of a third actuator; and a fourth shift valve converting a flow channel to selectively supply the hydraulic pressure of the first ejection flow channel supplied from the third shift valve to a first chamber of a fourth actuator and a first chamber of a fifth actuator and to selectively supply the hydraulic pressure of the second ejection flow channel supplied from the first shift valve to a second chamber of a fourth actuator and a second chamber of a fifth actuator, wherein the first, second, third and fourth shift valves are respectively and independently controlled by first, second, third and fourth solenoid valves on/off-controlling the hydraulic pressure supplied from a reducing valve controlling the line pressure into the hydraulic pressure to be further smaller and stable.

The control valve may include a first pressure control solenoid valve variably controlling the pressure of the line pressure supplied through the line pressure flow channel to be supplied to the first ejection flow channel, and a second pressure control solenoid valve variably controlling the pressure of the line pressure supplied through the line pressure flow channel to be supplied to the second ejection flow channel.

The control valve may be one flow rate control solenoid valve variably controlling the flow rate of the line pressure supplied through the line pressure flow channel to be selectively supplied to the first ejection flow channel and the second ejection flow channel.

The first and second, fourth actuator may control the odd-numbered shifting stage and the reverse speed, and the third, fifth actuator may control the even-numbered shifting stage.

The first and second chambers of the first actuator may be the chamber for the shifting of a seventh speed and a fifth speed, the first and second chambers of the second actuator may be the chamber for the shifting of a third speed and a first speed, the first and second chambers of the third actuator may be the chamber for the shifting of a second speed and a fourth speed, the first and second chambers of the fourth actuator may be the chamber for the shifting of a ninth speed and the reverse speed, and the first and second chambers of the fifth actuator may be the chamber for the shifting of an eighth speed and a sixth speed.

A fail-safe mode driving by the control of the third, fourth, and fifth actuators may be performed during a failure of the first solenoid valve or the second solenoid valve, and a fail-safe mode driving by the control of the first and second actuators may be performed during a failure of the third solenoid valve or the fourth solenoid valve.

The first shift valve may be a spool valve including a valve body and a valve spool disposed in the valve body and may convert the flow channel while being controlled by an elastic member disposed at one side end portion and the control pressure of the first solenoid valve acted on the opposite side thereof to correspond to an elastic force of the elastic member.

The valve body of the first shift valve may include a first port receiving a control pressure of the first solenoid valve, a second port receiving a hydraulic pressure of the first ejection flow channel, a third port selectively supplying the hydraulic pressure supplied to the second port to the first odd-numbered stage flow channel, a fourth port selectively supplying the hydraulic pressure supplied to the second port to the first even-numbered stage flow channel, a fifth port receiving the hydraulic pressure of the second ejection flow channel, a sixth port selectively supplying the hydraulic pressure supplied to the fifth port to the second odd-numbered stage flow channel, a seventh port selectively supplying the hydraulic pressure supplied to the fifth port to the second even-numbered stage flow channel, and three exhaust ports respectively exhausting the hydraulic pressure supplied to the third, fourth, and sixth, the seventh ports, and the valve spool of the first shift valve may include a first land selectively connecting the second port and the third port, a second land selectively connecting the second port and the fourth port along with the first land, a third land selectively connecting the fifth port and the sixth port, a fourth land selectively connecting the second port and the seventh port along with the third land, a fifth land acted with the control pressure of the first solenoid valve, and an elastic member disposed between the first land and the valve body.

The second shift valve may be the spool valve including a valve body and a valve spool disposed in the valve body and may convert the flow channel while being controlled by an elastic member disposed at one side end portion and the control pressure of the second solenoid valve acted on the opposite side thereof to correspond to the elastic force of the elastic member.

The valve body of the second shift valve may include a first port receiving the control pressure of the second solenoid valve, a second port receiving the hydraulic pressure of the first odd-numbered stage flow channel, a third port selectively supplying the hydraulic pressure supplied to the second port to the third odd-numbered stage flow channel, a fourth port selectively supplying the hydraulic pressure supplied to the second port to the fourth odd-numbered stage flow channel, a fifth port receiving the hydraulic pressure of the second odd-numbered stage flow channel, a sixth port selectively supply the hydraulic pressure supplied to the fifth port to the fifth odd-numbered stage flow channel, a seventh port selectively supplying the hydraulic pressure supplied to the fifth port to the sixth odd-numbered stage flow channel, and three exhaust ports exhausting the hydraulic pressure supplied to the third, fourth, sixth, and seventh ports, and the valve spool of the second shift valve may include a first land selectively connecting the second port and the third port, a second land selectively connecting the second port and the fourth port along with the first land, a third land selectively connecting the fifth port and the sixth port, a fourth land selectively connecting the second port and the seventh port along with the third land, a fifth land acted with the control pressure of the second solenoid valve, and an elastic member disposed between the first land and the valve body.

The third shift valve may be the spool valve including a valve body and a valve spool disposed in the valve body and may convert the flow channel while being controlled by an elastic member disposed at one side end portion and the control pressure of the third solenoid valve acted on the opposite side thereof to correspond to the elastic force of the elastic member.

The valve body of the third shift valve may include a first port receiving the control pressure of the third solenoid valve, a second port receiving the hydraulic pressure of the first even-numbered stage flow channel, a third port selectively supplying the hydraulic pressure supplied to the second port to the third even-numbered stage flow channel, a fourth port selectively supplying the hydraulic pressure supplied to the second port to the fourth even-numbered stage flow channel, a fifth port receiving the hydraulic pressure of the second even-numbered stage flow channel, a sixth port selectively supplying the hydraulic pressure supplied to the fifth port to the fifth even-numbered stage flow channel, a seventh port selectively supplying the hydraulic pressure supplied to the fifth port to the sixth even-numbered stage flow channel, and three exhaust ports respectively exhausting the hydraulic pressure supplied to the third, fourth, sixth, and seventh ports; and the valve spool of the third shift valve may include a first land selectively connecting the second port and the third port, a second land selectively connecting the second port and the fourth port along with the first land, a third land selectively connecting the fifth port and the sixth port, a fourth land selectively connecting the second port and the seventh port along with the third land, a fifth land acted with the control pressure of the third solenoid valve, and an elastic member disposed between the first land and the valve body.

The fourth shift valve may be the spool valve including a valve body and a valve spool disposed in the valve body and may convert the flow channel while being controlled by the elastic member disposed at one side end portion and the control pressure of the fourth solenoid valve acted on the opposite side thereof to correspond to the elastic force of the elastic member.

The valve body of the fourth shift valve may include a first port receiving the control pressure of the fourth solenoid valve, a second port receiving the hydraulic pressure of the third even-numbered stage flow channel, a third port selectively supplying the hydraulic pressure supplied to the second port to the seventh even-numbered stage flow channel, a fourth port selectively supplying the hydraulic pressure supplied to the second port to the eighth even-numbered stage flow channel, a fifth port receiving the hydraulic pressure of the fifth even-numbered stage flow channel, a sixth port selectively supplying the hydraulic pressure supplied to the fifth port to the ninth even-numbered stage flow channel, a seventh port selectively supplying the hydraulic pressure supplied to the fifth port to the tenth even-numbered stage flow channel, and three exhaust ports respectively exhausting the hydraulic pressure supplied to the third, fourth, sixth, and seventh ports, and the valve spool of the fourth shift valve may include a first land selectively connecting the second port and the third port, a second land selectively connecting the second port and the fourth port along with the first land, a third land selectively connecting the fifth port and the sixth port, a fourth land selectively connecting the second port and the seventh port along with the third land, a the fifth land acted with the control pressure of the fourth solenoid valve, and an elastic member disposed between the first land and the valve body.

The second solenoid valve may be connected to the flow channel to simultaneously control the second shift valve and the fourth shift valve.

The first and second chambers of the first actuator may be a chamber for the shifting of a third speed and a first speed, the first and second chambers of the second actuator may be a chamber for the shifting of a second speed and a fourth speed, the first and second chambers of the third actuator may be a chamber for the shifting of a ninth speed and a reverse speed, the first and second chambers of the fourth actuator may be a chamber for the shifting of a seventh speed and a fifth speed, and the first and second chambers of the fifth actuator may be the chamber for the shifting of an eight speed and a sixth speed.

The driving of a low speed stage or a high speed stage by the control of the first and second actuators or the third, fourth, and fifth actuators may be performed during the failure of the first solenoid valve, the driving of the odd-numbered shifting stage or even-numbered shifting stage by the control of the second and fourth actuators or the first and third actuators may be performed during the failure of the second solenoid valve, and the driving of the odd-numbered shifting stage or the low gear and high gear by the control of the first and second actuators or the first, second, third and fourth actuators may be performed during the failure of the third solenoid valve.

The second solenoid valve may be connected to the flow channel to simultaneously control the second shift valve and the third shift valve.

The first and second chambers of the first actuator may be the chamber for the shifting of a third speed and a first speed, the first and second chambers of the second actuator may be the chamber for the shifting of a second speed and a fourth speed, the first and second chambers of the third actuator may be the chamber for the shifting of a seventh speed and a fifth speed, the first and second chambers of the fourth actuator may be the chamber for the shifting of a ninth speed and the reverse speed, and the first and second chambers of the fifth actuator may be the chamber for the shifting of an eighth speed and a sixth speed.

The driving of a low speed stage or high speed stage by the control of the first and second actuators or the third, fourth, and fifth actuators may be performed during the failure of the first solenoid valve, the driving of the odd-numbered shifting stage or the even-numbered shifting stage by the control of the second and third actuators or the first, fourth, and fifth actuators may be performed during the failure of the second solenoid valve, and the driving of the odd-numbered shifting stage or low gear and high gear by the control of the first and second actuators or the first, second, third and fourth actuators may be performed during the failure of the fourth solenoid valve.

An exemplary embodiment of the present invention may implement the shifting stage of the nine foreword speeds and one reverse speed while the flow channel of the first to fourth shift valves is converted depending on the independent control of the control valve and the first to fourth solenoid valves.

Also, an exemplary embodiment of the present invention commonly utilizes the shift valves related to the shifting to be configured with the minimum number, reducing the production cost.

Also, in an exemplary embodiment of the present invention, as the first and second actuators related to the odd-numbered shifting stage, and the third, fourth, and fifth actuators related to the even-numbered stage the reverse speed to supply the hydraulic pressure, the fail-safe mode driving by the control of the third, fourth, and fifth actuators may be possible during the failure of the first solenoid valve or the second solenoid valve, and the fail-safe mode driving by the control of the first and second actuators may be performed during the failure of the third solenoid valve or the fourth solenoid valve.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1A:
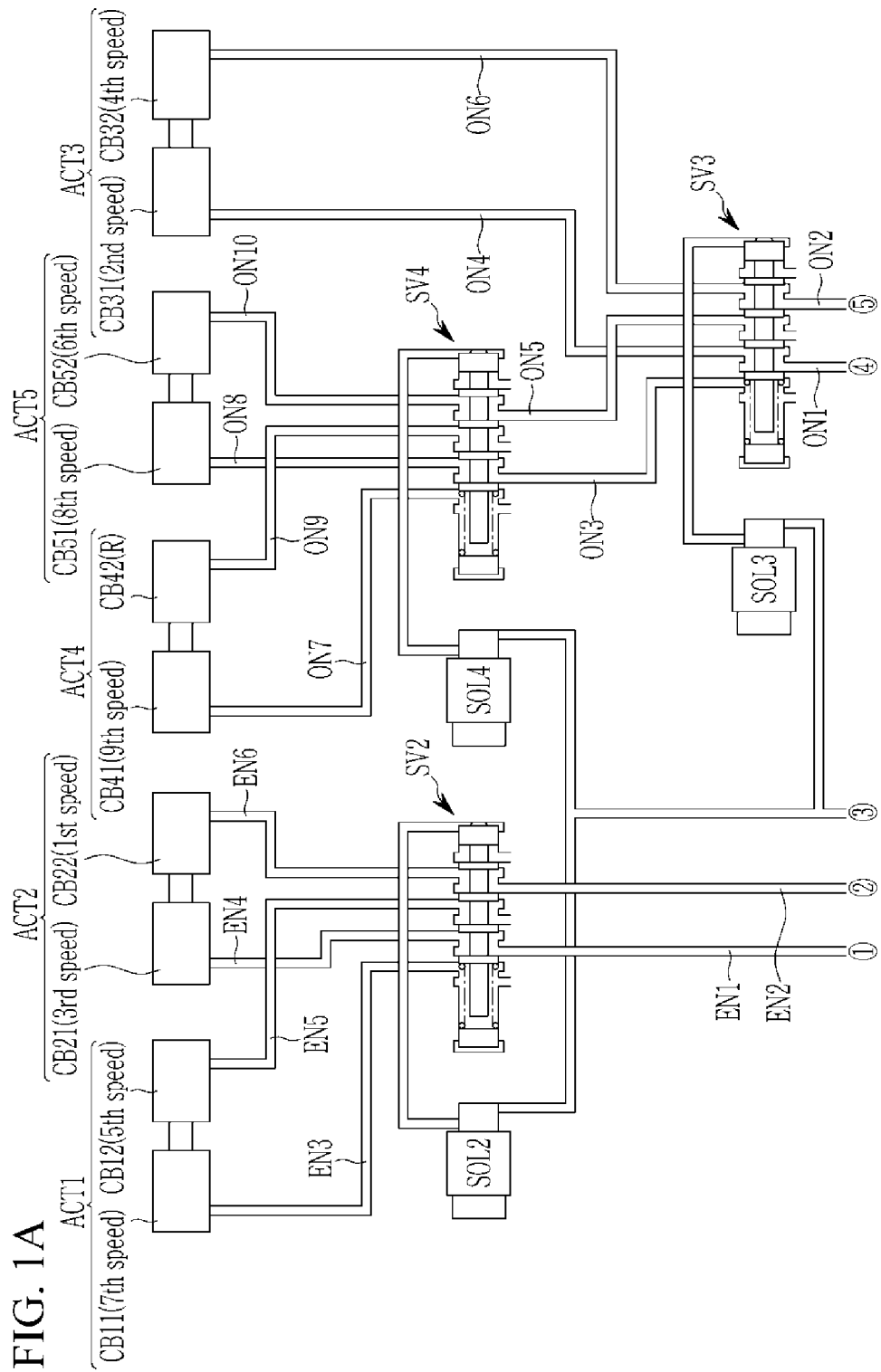
FIG. 1A and FIG. 1B are schematic diagrams of a hydraulic control system of a shift control device of a dual clutch transmission according to various exemplary embodiments of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the contrary, the present invention(s) is/are intended to cover not only the exemplary embodiments of the present invention, but also various alternatives, modifications, equivalents and other embodiments, which may be included within the spirit and scope of the present invention as defined by the appended claims.

Exemplary embodiments of the present application will be described more fully hereinafter with reference to the accompanying drawings, in which exemplary embodiments of the present invention are shown. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

In the following description, dividing names of components into first and second and the like is to divide the names because the names of the components are the same as each other and an order thereof is not particularly limited.

Figure 1B:
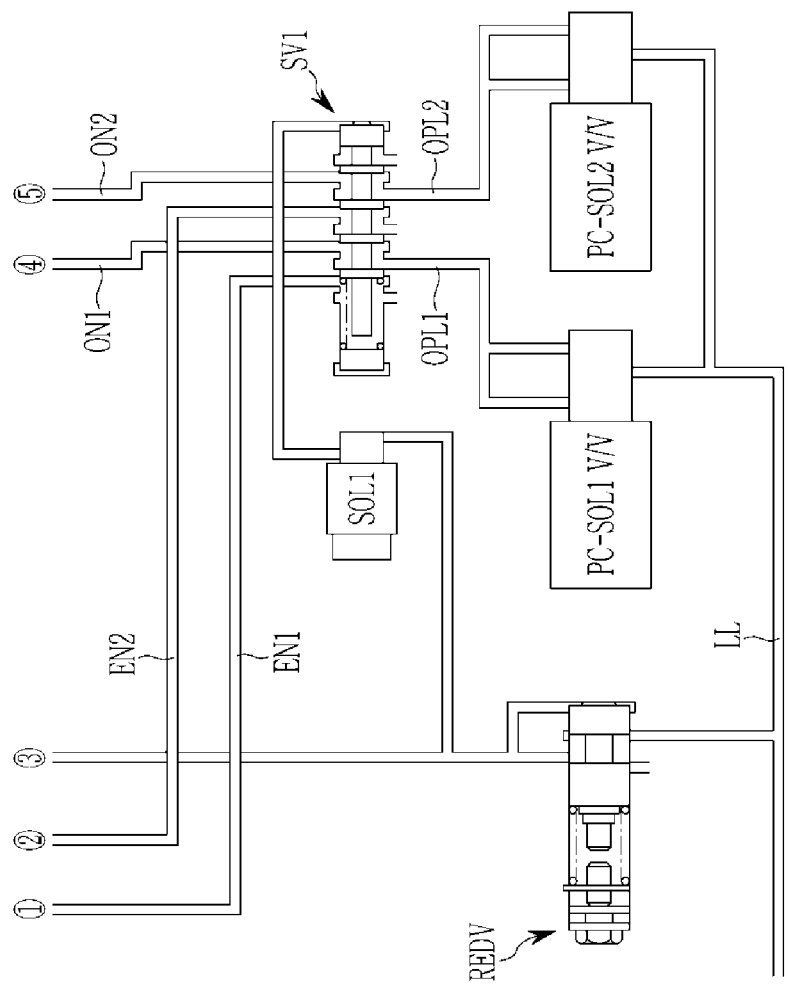

FIG. 1A and FIG. 1B are schematic diagrams of a hydraulic control system of a shift control device of a dual clutch transmission according to various exemplary embodiments of the present invention.

Referring to FIG. 1A and FIG. 1B, the hydraulic control system of the shift control device of the dual clutch transmission according to the various exemplary embodiments of the present invention may include first and second pressure control solenoid valves PC-SOL1 V/V and PC-SOL2 V/V applied as a control valve, first, second, third and fourth shift valves SV1 to SV4, first, second, third and fourth solenoid valves SOL1 to SOL4, first, second, third, fourth, and fifth actuators ACT1 to ACT5, and a reducing valve REDV.

A fluid stored in a sump of the transmission is pumped in a hydraulic pump is supplied to a line pressure flow channel LL. The hydraulic pressure supplied to the line pressure flow channel LL is controlled into a stable line pressure in a line regulator valve and is supplied to the first and second pressure control solenoid valves PC-SOL1 V/V and PC-SOL2 V/V of the control valve and the reducing valve REDV.

The first and second input control solenoid valves PC-SOL1 V/V and PC-SOL2 V/V are a variable type solenoid valve and variably controls the line pressure supplied through the line pressure flow channel LL depending on a multitude of an electricity applied from a transmission control device to be supplied to the first shift valve SV1 through the first and second ejection flow channels OPL1 and OPL2.

Thus, in the first shift valve SV1, the hydraulic pressure supplied through the first and second ejection flow channels OPL1 and OPL2 may be selectively supplied to the second shift valve SV2 and the third shift valve SV3.

The hydraulic pressure supplied to the second shift valve SV2 is supplied to the first and second actuators ACT1 and ACT2 related to the odd-numbered shifting stages. The hydraulic pressure supplied to the third shift valve SV3 is supplied to the third actuator ACT3 related to the even-numbered stages or is supplied to the fourth and fifth actuators ACT4 and ACT5 through the fourth shift valve SV4, implementing a fixed shifting stage of nine foreword speed stages and one reverse speed.

Also, the first to fifth actuators ACT1 to ACT5, as well-known, are a mechanism applied to a synchronizer of a manual transmission and moving back and forth a shift rail including a shift fork in an axial direction to reciprocate a sleeve synchronously connecting a driving or driven gear of each shift stage with a rotation axis in the axial direction thereof.

Accordingly, the first to fifth actuators ACT1 to ACT5, in which first chambers CB11, CB21, CB31, CB41, and CB51, in which a piston is disposed on one side, are formed, and second chambers CB12, CB22, CB32, CB42, and CB52, in which a piston is disposed on the other side, are formed, and a hydraulic pressure is supplied to the chamber selected among the chambers, realizing the shifting.

Also, the reducing valve REDV controls the hydraulic pressure supplied through the line pressure flow channel LL to be stable with a pressure lower than the line pressure and supplies the stable pressure to the first to fourth solenoid valves SOL1 to SOL4.

The first to fourth solenoid valves SOL1 to SOL4 as an on/off solenoid valve respectively control first to fourth shift valves SV1 to SV4 that are independently connected according to the control of a transmission control device.

The first shift valve SV1 selectively supplies the hydraulic pressure supplied to the first ejection flow channel OPL1 to the first odd-numbered stage flow channel EN1 or the first even-numbered stage flow channel ON1, or selectively supplies the hydraulic pressure supplied to the second ejection flow channel OPL2 to the second odd-numbered stage flow channel EN2 or the second even-numbered stage flow channel ON2 while converting the flow channel by the control of the first solenoid valve SOL1.

The second shift valve SV2 selectively supplies the hydraulic pressure supplied to the first odd-numbered stage flow channel EN11 to the third odd-numbered stage flow channel EN3 or the fourth odd-numbered stage flow channel EN4, or selectively supplies the hydraulic pressure supplied to the second odd-numbered stage flow channel EN2 to the fifth odd-numbered stage flow channel EN5 or the sixth odd-numbered stage flow channel EN6 while converting the flow channel by the control of the second solenoid valve SOL2.

In the above, the third odd-numbered stage flow channel EN3 is connected to the first chamber CB11 of the first actuator ACT1, the fourth odd-numbered stage flow channel EN4 is connected to the first chamber CB21 of the second actuator ACT2, the fifth odd-numbered stage flow channel EN5 is connected to the second chamber CB12 of the first actuator ACT1, and the sixth odd-numbered stage flow channel EN6 is connected to the second chamber CB22 of the second actuator ACT2.

Also, FIG. 1A and FIG. 1B disclos that the first and second chambers CB11 and CB12 of the first actuator ACT1 are the chamber for the shifting of the foreword seventh speed and fifth speed and the first and second chambers CB21 and CB22 of the second actuator ACT2 are the chamber for the shifting of the foreword third speed and first speed, however it is not limited thereto and it may be differentiate depending on a design condition of the transmission.

The third shift valve SV3 selectively supplies the hydraulic pressure supplied to the first even-numbered stage flow channel ON11 to the third even-numbered stage flow channel ON3 or the fourth even-numbered stage flow channel ON4 or selectively supplies the hydraulic pressure supplied to the second even-numbered stage flow channel ON2 to the fifth even-numbered stage flow channel ON5 or the sixth even-numbered stage flow channel ON6 while converting the flow channel by the control of the third solenoid valve SOL3.

In the above, the fourth even-numbered stage flow channel ON4 is connected to the first chamber CB31 of the third actuator ACT3, and the sixth even-numbered stage flow channel ON6 is connected to the second chamber CB32 of the third actuator ACT3.

The fourth shift valve SV4 selectively supplies the hydraulic pressure supplied to the third even-numbered stage flow channel ON31 to the seventh even-numbered stage flow channel ON7 or the eighth even-numbered stage flow channel ON8 or selectively supplies the hydraulic pressure supplied to the fifth even-numbered stage flow channel ON5 to the ninth even-numbered stage flow channel ON9 or the tenth even-numbered stage flow channel ON10 while converting the flow channel by the control of the fourth solenoid valve SOL4.

In the above, the seventh even-numbered stage flow channel ON7 is connected to the first chamber CB41 of the fourth actuator ACT4, the eighth even-numbered stage flow channel ON8 is connected to the first chamber CB51 of the fifth actuator ACT5, the ninth even-numbered stage flow channel ON9 is connected to the second chamber CB42 of the fourth actuator ACT4, and the tenth even-numbered stage flow channel ON10 is connected to the second chamber CB52 of the fifth actuator ACT5.

Also, FIG. 1 may include that the first and second chambers CB11 and CB12 of the third actuator ACT3 are the chamber for the shifting of the foreword second speed and fourth speed, the first and second chambers CB41 and CB42 of the fourth actuator ACT4 is the chamber for the shifting of the foreword ninth speed and the reverse speed, and the first and second chambers CB51 and CB52 the of the fifth actuator ACT5 are the chamber for the shifting of the foreword eighth speed and sixth speed, however it is not limited thereto and it may be differentiate depending on the design condition of the transmission.

Figure 2A:
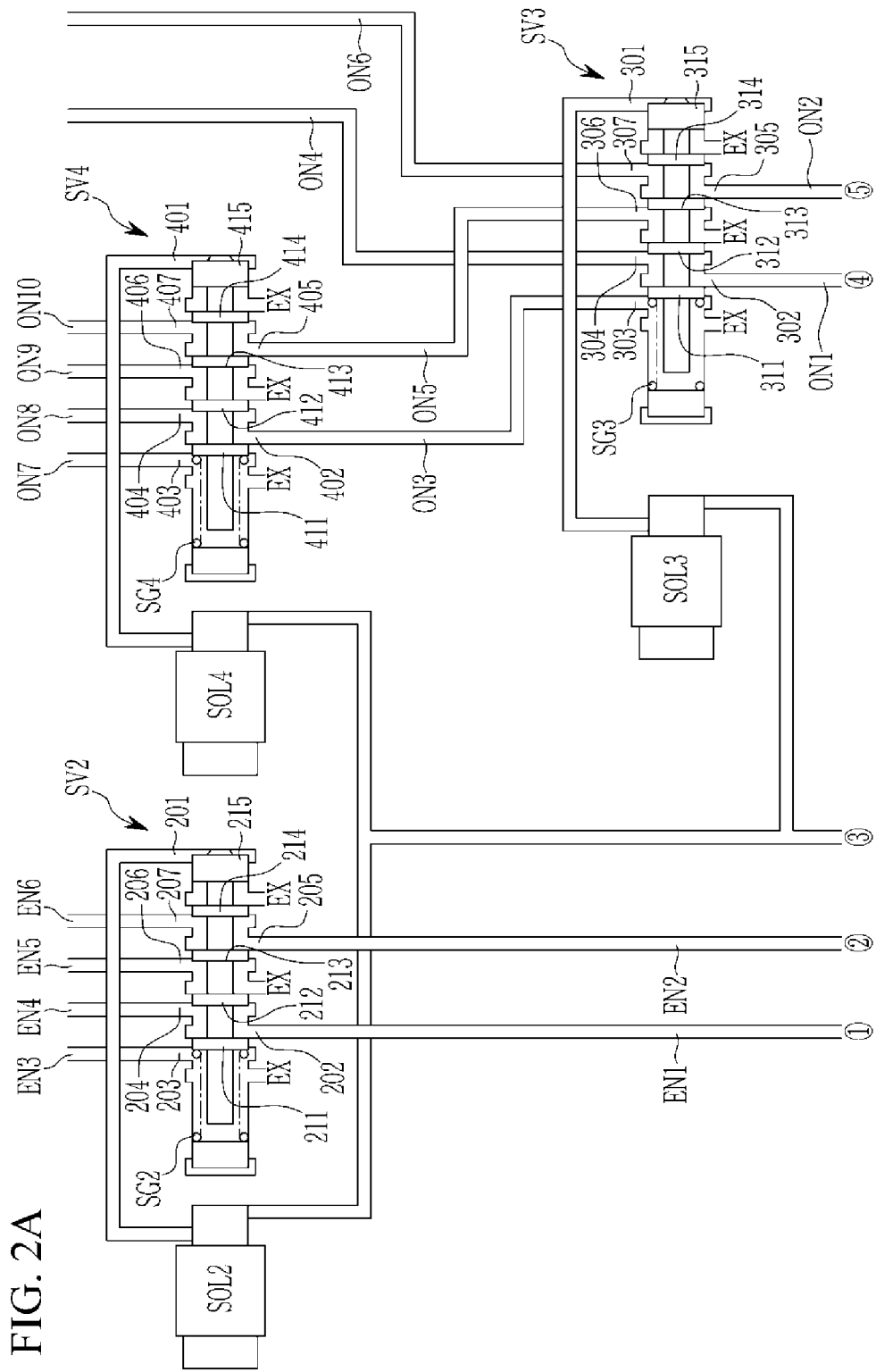
FIG. 2A and FIG. 2B are excerpt views for explaining a configuration of a shift valve in a hydraulic control system of a shift control device of a dual clutch transmission according to various exemplary embodiments of the present invention.
Figure 2B:
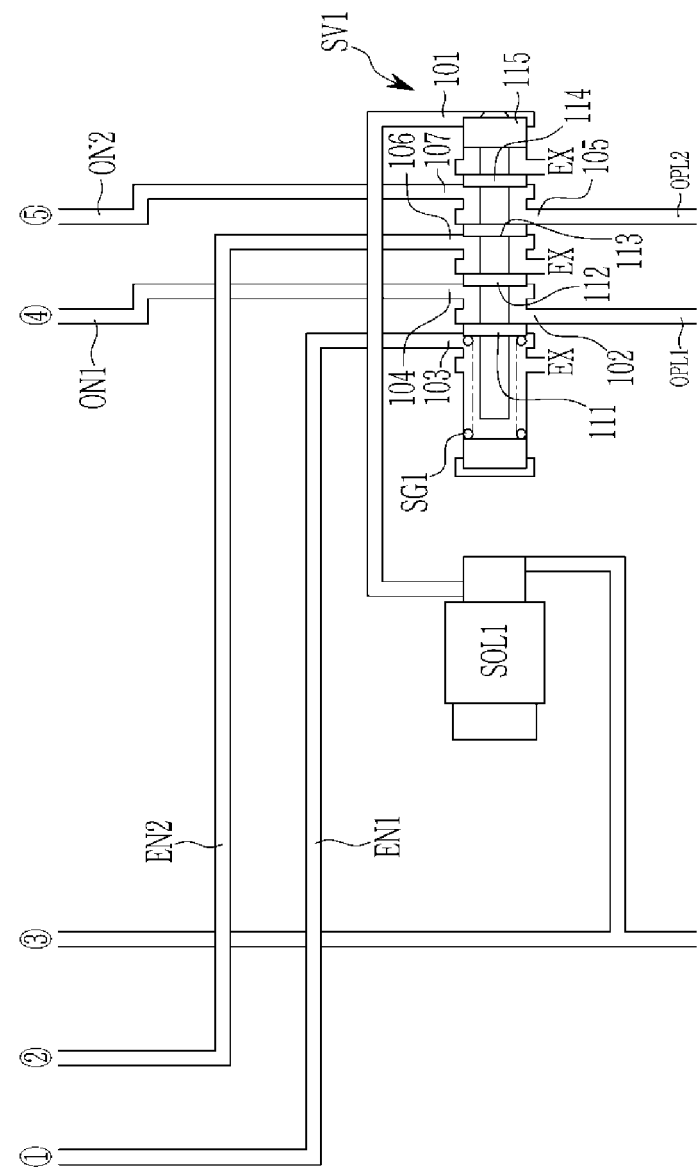

FIG. 2A and FIG. 2B are excerpt views for explaining a configuration of a shift valve in a hydraulic control system of a shift control device of a dual clutch transmission according to various exemplary embodiments of the present invention.

Referring to FIG. 2A and FIG. 2B, the first shift valve SV1 may selectively supply the hydraulic pressure supplied to the first and second ejection flow channels OPL1 and OPL2 to the second shift valve SV2 and the third shift valve SV3.

The first shift valve SV1 may be the spool valve including a valve body and a valve spool disposed in the valve body. The first shift valve SV1 converts the flow channel while being controlled by the elastic member SG1 disposed on one side end portion and the control pressure of the first solenoid valve SOL1 acted on the opposite side thereof to correspond to the elastic force of the elastic member SG1.

The valve body may include the first port 101 receiving the control pressure of the first solenoid valve SOL1, the second port 102 receiving the hydraulic pressure of the first ejection flow channel OPL1, the third port 103 selectively supplying the hydraulic pressure supplied to the second port 102 to the first odd-numbered stage flow channel EN1, the fourth port 104 selectively supplying the hydraulic pressure supplied to the second port 102 to the first even-numbered stage flow channel ON1, the fifth port 105 receiving the hydraulic pressure of the second ejection flow channel OPL2, the sixth port 106 selectively supplying the hydraulic pressure supplied to the fifth port 105 to the second odd-numbered stage flow channel EN2, the seventh port 107 selectively supplying the hydraulic pressure supplied to the fifth port 105 to the second even-numbered stage flow channel ON2, and three exhaust ports EX exhausting the hydraulic pressure supplied to the third, fourth, sixth, and seventh ports 103, 104, 106, and 107.

The valve spool may include the first land 111 selectively connecting the second port 102 and the third port 103, the second land 112 selectively connecting the second port 102 and the fourth port 104 along with the first land 111, the third land 113 selectively connecting the fifth port 105 and the sixth port 106, the fourth land 114 selectively connecting the second port 102 and the seventh port 107 along with the third land 113, and the fifth land 115 on which the control pressure of the first solenoid valve SOL1 is acted.

Accordingly, if the first solenoid valve SOL1 is off-controlled, the valve spool moves to the right in the drawing such that the first shift valve SV1 forms the flow channel to supply the hydraulic pressure supplied to the second port 102 to the fourth port 104 and to supply the hydraulic pressure supplied to the fifth port 105 to the seventh port 107.

In the instant case, the third and sixth ports 103 and 106 are connected to the exhaust port EX to exhaust the hydraulic pressure supplied through the first and second odd-numbered stage flow channels EN1 and EN2.

Also, in contrast, if the first solenoid valve SOL1 is on-controlled, the valve spool moves to the left in the drawing such that the flow channel is formed to supply the hydraulic pressure supplied to the second port 102 to the third port 103 and to supply the hydraulic pressure supplied to the fifth port 105 to the sixth port 106.

In the instant case, the fourth and seventh ports 204 and 207 are connected to the exhaust port EX to exhaust the hydraulic pressure supplied through the first and second even-numbered stage flow channels ON1 and ON2.

The second shift valve SV2 may selectively supply the hydraulic pressure supplied through the first and second odd-numbered stage flow channels EN1 and EN2 to the first and second chambers CB11 and CB12 of the first actuator ACT1 and the first and second chambers CB21 and CB22 of the second actuator ACT.

The second shift valve SV2 may be the spool valve including the valve body and the valve spool disposed on the valve body. The second shift valve SV2 converts the flow channel while being controlled by the elastic member SG2 disposed on one side end portion and the control pressure of the second solenoid valve SOL2 acted on the opposite side thereof to correspond to the elastic force of the elastic member SG2.

The valve body may include the first port 201 receiving the control pressure of the second solenoid valve SOL2, the second port 202 receiving the hydraulic pressure of the first odd-numbered stage flow channel EN1, the third port 203 selectively supplying the hydraulic pressure supplied to the second port 202 to the third odd-numbered stage flow channel EN3, the fourth port 204 selectively supplying the hydraulic pressure supplied to the second port 202 to the fourth odd-numbered stage flow channel EN4, the fifth port 205 receiving the hydraulic pressure of the second odd-numbered stage flow channel EN2, the sixth port 206 selectively supplying the hydraulic pressure supplied to the fifth port 205 to the fifth odd-numbered stage flow channel EN6, the seventh port 207 selectively supplying the hydraulic pressure supplied to the fifth port 205 to sixth odd-numbered stage flow channel EN6, and three exhaust ports EX exhausting the hydraulic pressure supplied to the third, fourth, sixth, and seventh ports 203, 204, 206, and 207.

The valve spool may include the first land 211 selectively connecting the second port 202 and the third port 203, the second land 212 selectively connecting the second port 202 and the fourth port 204 along with the first land 211, the third land 213 selectively connecting the fifth port 205 and the sixth port 206, the fourth land 214 selectively connecting the second port 202 and the seventh port 207 along with the third land 213, and the fifth land 215 on which the control pressure of the second solenoid valve SOL2 is acted.

Accordingly, if the second solenoid valve SOL2 is off-control, the valve spool moves to the right in the drawing such that the second shift valve SV2 forms the flow channel to supply the hydraulic pressure supplied to the second port 202 to the fourth port 204 and to supply the hydraulic pressure supplied to the fifth port 205 to the seventh port 207.

In the instant case, third, the sixth ports 203 and 206 are connected to the exhaust port EX to exhaust the hydraulic pressure supplied through the third and fifth odd-numbered stage flow channels EN3 and EN5.

Also, in contrast, if the second solenoid valve SOL2 is on-controlled, the valve spool moves to the left in the drawing such that the flow channel is formed to supply the hydraulic pressure supplied to the second port 202 to the third port 203 and to supply the hydraulic pressure supplied to the fifth port 205 to the sixth port 206.

In the instant case, the fourth and seventh ports 204 and 207 are respectively connected to the exhaust port EX to exhaust the hydraulic pressure supplied to the fourth and sixth odd-numbered stage flow channels EN4 and EN6.

The third shift valve SV3 may selectively supply the hydraulic pressure supplied to the first and second even-numbered stage flow channels ON1 and ON2 to the first and second chambers CB31 and CB32 of the third actuator ACT3 and the fourth shift valve SV4.

The third shift valve SV3 may be the spool valve including the valve body and the valve spool disposed in the valve body. The third shift valve SV3 converts the flow channel while being controlled by the elastic member SG3 disposed on one side end portion and the control pressure of the third solenoid valve SOL3 acted on the opposite side thereof to correspond to the elastic force of the elastic member SG3.

The valve body may include the first port 301 receiving the control pressure of the third solenoid valve SOL3, the second port 302 receiving the hydraulic pressure of the first even-numbered stage flow channel ON1, the third port 303 selectively supplying the hydraulic pressure supplied to the second port 302 to the third even-numbered stage flow channel ON3, the fourth port 304 selectively supplying the hydraulic pressure supplied to the second port 302 to the fourth even-numbered stage flow channel ON4, the fifth port 305 receiving the hydraulic pressure of the second even-numbered stage flow channel ON2, the sixth port 306 selectively supplying the hydraulic pressure supplied to the fifth port 305 to the fifth even-numbered stage flow channel ON5, the seventh port 307 selectively supplying the hydraulic pressure supplied to the fifth port 305 to the sixth even-numbered stage flow channel ON6, and three exhaust ports EX exhausting the hydraulic pressure to the third, fourth, sixth, and seventh ports 303, 304, 306, and 307.

The valve spool may include the first land 311 selectively connecting the second port 302 and the third port 303, the second land 312 selectively connecting the second port 302 and the fourth port 304 along with the first land 311, the third land 313 selectively connecting the fifth port 305 and the sixth port 306, the fourth land 314 selectively connecting the second port 302 and the seventh port 307 along with the third land 313, and the fifth land 315 on which the control pressure of the third solenoid valve SOL3 is acted.

Accordingly, if the third solenoid valve SOL3 is off-controlled, the valve spool moves to the right in the drawing such that the third shift valve SV3 forms the flow channel to supply the hydraulic pressure supplied to the second port 302 to the fourth port 304 and to supply the hydraulic pressure supplied to the fifth port 305 to the seventh port 307.

In the instant case, the third and sixth ports 303 and 306 are respectively connected to the exhaust port EX to exhaust the hydraulic pressure supplied through the third and fifth even-numbered stage flow channels ON3 and ON5.

Also, in contrast, if the third solenoid valve SOL3 is on-controlled, the valve spool moves to the left in the drawing such that the flow channel is formed to supply the hydraulic pressure supplied to the second port 302 to the third port 303 and to supply the hydraulic pressure supplied to the fifth port 305 to the sixth port 306.

In the instant case, the fourth and seventh ports 304 and 307 are respectively connected to the exhaust port EX to exhaust the hydraulic pressure supplied through the fourth and sixth even-numbered stage flow channels ON4 and ON6.

The fourth shift valve SV4 may selectively supply the hydraulic pressure supplied through the third and fifth even-numbered stage flow channels ON3 and ON5 to the first and second chambers CB41 and CB42 of the fourth actuator ACT4 and the first and second chambers CB51 and CB52 of the fifth actuator ACT5.

The fourth shift valve SV4 may be the spool valve including the valve body and the valve spool disposed in the valve body. The fourth shift valve SV4 converts the flow channel while being controlled by the elastic member SG4 disposed on one side end portion and the control pressure of the fourth solenoid valve SOL4 acted on the opposite side thereof to correspond to the elastic force of the elastic member SG4.

The valve body may include the first port 401 receiving the control pressure of the fourth solenoid valve SOL4, the second port 402 receiving the hydraulic pressure of the third even-numbered stage flow channel ON3, the third port 403 selectively supplying the hydraulic pressure supplied to the second port 402 to the seventh even-numbered stage flow channel ON7, the fourth port 404 selectively supplying the hydraulic pressure supplied to the second port 402 to the eighth even-numbered stage flow channel ON8, the fifth port 405 receiving the hydraulic pressure of the fifth even-numbered stage flow channel ON5, the sixth port 406 selectively supplying the hydraulic pressure supplied to the fifth port 405 to the ninth even-numbered stage flow channel ON9, the seventh port 407 selectively supplying the hydraulic pressure supplied to the fifth port 405 to the tenth even-numbered stage flow channel ON10, and three exhaust ports EX exhausting the hydraulic pressure supplied to the third, fourth, sixth, and seventh ports 403, 404, 406, and 407.

The valve spool may include the first land 411 selectively connecting the second port 402 and the third port 403, the second land 412 selectively connecting the second port 402 and the fourth port 404 along with the first land 411, the third land 413 selectively connecting the fifth port 405 and the sixth port 406, the fourth land 414 selectively connecting the second port 402 and the seventh port 407 along with the third land 413, and the fifth land 415 on which the control pressure of the fourth solenoid valve SOL4 is acted.

Accordingly, if the fourth solenoid valve SOL4 is off-controlled, the valve spool moves to the right in the drawing such that the fourth shift valve SV4 forms the flow channel to supply the hydraulic pressure supplied to the second port 402 to the fourth port 404 and to supply the hydraulic pressure supplied to the fifth port 405 to the seventh port 407.

In the instant case, the third and sixth ports 403 and 406 are respectively connected to the exhaust port EX to exhaust the hydraulic pressure supplied through the seventh and ninth even-numbered stage flow channels ON7 and ON9.

Also, in contrast, if the fourth solenoid valve SOL4 is on-controlled, the valve spool moves to the left in the drawing such that the flow channel is formed to supply the hydraulic pressure supplied to the second port 402 to the third port 403 and to supply the hydraulic pressure supplied to the fifth port 405 to the sixth port 406.

In the instant case, the fourth and seventh ports 404 and 407 are respectively connected to the exhaust port EX to exhaust the hydraulic pressure supplied through the eighth and tenth even-numbered stage flow channels ON8 and ON10.

Next, the supply path of the hydraulic pressure to each of the actuators ACT1 to ACT5 will be described with reference to FIG. 1A to FIG. 2B.

The hydraulic pressure which is pressure-controlled by the first pressure control solenoid valve PC-SOL1 V/V is supplied to the first chamber CB11 of the first actuator ACT1.

The second port 102 of the first shift valve SV1 and the third port 103 are connected depending on the on control of the first solenoid valve SOL1 such that the hydraulic pressure which is pressure-controlled in the first pressure control solenoid valve PC-SOL1 V/V is supplied to the second port 202 of the second shift valve SV2 through the first odd-numbered stage flow channel EN1.

Thus, in the second shift valve SV2, as the second port 202 and the third port 203 are connected depending on the on control of the second solenoid valve SOL2, the hydraulic pressure supplied to the second port 202 may be supplied to the first chamber CB11 of the first actuator ACT1 through the third odd-numbered stage flow channel EN3 connected to the third port 203.

The hydraulic pressure which is pressure-controlled by the second pressure control solenoid valve PC-SOL2 V/V may be supplied to the second chamber CB12 of the first actuator ACT1.

The fifth port 105 of the first shift valve SV1 and the sixth port 106 are connected depending on the on control of the first solenoid valve SOL1 such that the hydraulic pressure which is pressure-controlled in the second pressure control solenoid valve PC-SOL2 V/V is supplied to the fifth port 205 of the second shift valve SV2 through the second odd-numbered stage flow channel EN2.

Thus, as the fifth port 205 and the sixth port 206 are connected depending on the on control of the second solenoid valve SOL2 in the second shift valve SV2, the hydraulic pressure supplied to the fifth port 205 may be supplied to the second chamber CB12 of the first actuator AC1T through the fifth odd-numbered stage flow channel EN5 connected to the sixth port 206.

The hydraulic pressure which is pressure-controlled by the first pressure control solenoid valve PC-SOL1 V/V may be supplied to the first chamber CB21 of the second actuator ACT2.

The second port 102 of the first shift valve SV1 and the third port 103 are connected depending on the first solenoid valve SOL1 such that the hydraulic pressure which is pressure-controlled in the first pressure control solenoid valve PC-SOL1 V/V is supplied to the second port 202 of the second shift valve SV2 through the first odd-numbered stage flow channel EN1.

Thus, in the second shift valve SV2, as the second port 202 and the fourth port 204 are connected depending on the off control of the second solenoid valve SOL2, the hydraulic pressure supplied to the second port 202 may be supplied to the first chamber CB21 of the second actuator ACT2 through the fourth odd-numbered stage flow channel EN connected to the fourth port 204.

The hydraulic pressure which is pressure-controlled by the second pressure control solenoid valve PC-SOL2 V/V may be supplied to the second chamber CB22 of the second actuator ACT2.

The fifth port 105 of the first shift valve SV1 and the sixth port 106 are connected depending on the on control of the first solenoid valve SOL1 such that the hydraulic pressure which is pressure-controlled in the second pressure control solenoid valve PC-SOL2 V/V is supplied to the fifth port 205 of the second shift valve SV2 through the second odd-numbered stage flow channel EN2.

Thus, as the fifth port 205 and the seventh port 207 are connected depending on the off control of the second solenoid valve SOL2 in the second shift valve SV2, the hydraulic pressure supplied to the fifth port 205 may be supplied to the second chamber CB22 of the second actuator ACT2 through the sixth odd-numbered stage flow channel EN6 connected to the seventh port 207.

The hydraulic pressure which is pressure-controlled by the first pressure control solenoid valve PC-SOL1 V/V may be supplied to the first chamber CB31 of the third actuator ACT3.

The second port 102 of the first shift valve SV1 and the fourth port 104 are connected depending on the off control of the first solenoid valve SOL1 such that the hydraulic pressure which is pressure-controlled in the first pressure control solenoid valve PC-SOL1 V/V is supplied to the second port 302 of the third shift valve SV3 through the first even-numbered stage flow channel ON1.

Thus, in the third shift valve SV3, as the second port 302 and the fourth port 304 are connected depending on the off control of the third solenoid valve SOL3, the hydraulic pressure supplied to the second port 302 may be supplied to the first chamber CB31 of the third actuator ACT3 through the fourth even-numbered stage flow channel ON4 connected to the fourth port 304.

The hydraulic pressure which is pressure-controlled by the second pressure control solenoid valve PC-SOL2 V/V may be supplied to the second chamber CB32 of the third actuator ACT3.

The fifth port 105 of the first shift valve SV1 and the sixth port 106 are connected depending on the off control of the first solenoid valve SOL1 such that the hydraulic pressure which is pressure-controlled in the second pressure control solenoid valve PC-SOL2 V/V is supplied to the fifth port 305 of the third shift valve SV3 through the second even-numbered stage flow channel ON2.

Thus, in the third shift valve SV3, as the fifth port 305 and the seventh port 307 are connected depending on the off control of the third solenoid valve SOL3, the hydraulic pressure supplied to the fifth port 305 may be supplied to the second chamber CB32 of the third actuator ACT3 through the sixth even-numbered stage flow channel ON6 connected to the seventh port 307.

The hydraulic pressure which is pressure-controlled by the first pressure control solenoid valve PC-SOL1 V/V may be supplied to the first chamber CB41 of the fourth actuator ACT4.

The second port 102 of the first shift valve SV1 and the fourth port 104 are connected depending on the off control of the first solenoid valve SOL1 such that the hydraulic pressure which is pressure-controlled in the first pressure control solenoid valve PC-SOL1 V/V is supplied to the second port 302 of the third shift valve SV3 through the first even-numbered stage flow channel ON1.

Thus, in the third shift valve SV3, as the second port 302 and the third port 303 are connected depending on the on control of the third solenoid valve SOL3, the hydraulic pressure supplied to the second port 302 is supplied to the second port 402 of the fourth shift valve SV4 through the third even-numbered stage flow channel ON3 connected to the third port 303.

Also, in the fourth shift valve SV4, as the second port 402 and the third port 403 are connected depending on the on control of the fourth solenoid valve SOL4, the hydraulic pressure supplied to the second port 402 may be supplied to the first chamber CB41 of the fourth actuator ACT4 through the seventh even-numbered stage flow channel ON7 connected to the third port 403.

The hydraulic pressure which is pressure-controlled by the second pressure control solenoid valve PC-SOL2 V/V may be supplied to the second chamber CB42 of the fourth actuator ACT4.

The fifth port 105 of the first shift valve SV1 and the sixth port 106 are connected depending on the off control of the first solenoid valve SOL1 such that the hydraulic pressure which is pressure-controlled in the second pressure control solenoid valve PC-SOL2 V/V is supplied to the fifth port 305 of the third shift valve SV3 through the second even-numbered stage flow channel ON2.

Thus, in the third shift valve SV3, as the fifth port 305 and the sixth port 306 are connected depending on the on control of the third solenoid valve SOL3, the hydraulic pressure supplied to the fifth port 305 is supplied to the fifth port 405 of the fourth shift valve SV4 through the fifth even-numbered stage flow channel ON5 connected to the sixth port 306.

Also, in the fourth shift valve SV4, as the fifth port 405 and the sixth port 406 are connected depend on the on control of the fourth solenoid valve SOL4, the hydraulic pressure supplied to the fifth port 405 may be supplied to the second chamber CB42 of the fourth actuator ACT4 through the ninth even-numbered stage flow channel ON9 connected to the sixth port 406.

That hydraulic pressure which is pressure-controlled by the first pressure control solenoid valve PC-SOL1 V/V may be supplied to the first chamber CB51 of the fifth actuator ACT5.

The second port 102 of the first shift valve SV1 and the fourth port 104 are connected depending on the off control of the first solenoid valve SOL1 such that the hydraulic pressure which is pressure-controlled in the first pressure control solenoid valve PC-SOL1 V/V is supplied to the second port 302 of the third shift valve SV3 through the first even-numbered stage flow channel ON1.

Thus, in the third shift valve SV3, as the second port 302 and the third port 303 are connected depending on the on control of the third solenoid valve SOL3, the hydraulic pressure supplied to the second port 302 is supplied to the second port 402 of the fourth shift valve SV4 through the third even-numbered stage flow channel ON3 connected to the third port 303.

Also, in the fourth shift valve SV4, as the second port 402 and the fourth port 404 are connected depending on the off control of the fourth solenoid valve SOL4, the hydraulic pressure supplied to the second port 402 may be supplied to the first chamber CB51 of the fifth actuator ACT5 through the eighth even-numbered stage flow channel ON8 connected to the fourth port 404.

The hydraulic pressure which is pressure-controlled by the second pressure control solenoid valve PC-SOL2 V/V may be supplied to the second chamber CB52 of the fifth actuator ACT5.

The fifth port 105 of the first shift valve SV1 and the seventh port 107 are connected depending on the off control of the first solenoid valve SOL1 such that the hydraulic pressure which is pressure-controlled in the second pressure control solenoid valve PC-SOL2 V/V is supplied to the fifth port 305 of the third shift valve SV3 through the second even-numbered stage flow channel ON2.

Thus, in the third shift valve SV3, the fifth port 305 and the sixth port 306 are connected depending on the on control of the third solenoid valve SOL3, the hydraulic pressure supplied to the fifth port 305 is supplied to the fifth port 405 of the fourth shift valve SV4 through the fifth even-numbered stage flow channel ON5 connected to the sixth port 306.

Also, in the fourth shift valve SV4, as the fifth port 405 and the seventh port 407 are connected depending on the off control of the fourth solenoid valve SOL4, the hydraulic pressure supplied to the fifth port 405 may be supplied to the second chamber CB52 of the fifth actuator ACT5 through the tenth even-numbered stage flow channel ON10 connected to the seventh port 407.

Accordingly, the hydraulic control system of the shift control device of the dual clutch transmission according to the various exemplary embodiments of the present invention may implement the foreword nine speed stages and one reverse speed while converting the flow channel of the first to fourth shift valves SV1 to SV4 according to the independent control of the first and second pressure control solenoid valves PC-SOL1 V/V and PC-SOL2 V/V of the control valve and the first to fourth solenoid valves SOL1 to SOL4.

Also, the hydraulic control system of the shift control device of the dual clutch transmission according to the various exemplary embodiments of the present invention commonly utilizes the shift valves related to the shifting to be configured with the minimum number, reducing the production cost.

Also, as the hydraulic control system of the shift control device of the dual clutch transmission according to the various exemplary embodiments of the present invention is divided into the first and second actuators ACT1 and ACT2 related to the odd-numbered shifting stage and the third, fourth, and fifth actuators ACT3, ACT4, and ACT5 related to the even-numbered stage and the reverse speed to supply the hydraulic pressure, the fail-safe mode driving by the control of the third, fourth, and fifth actuators ACT3, ACT4, and ACT5 is possible during the failure of the first solenoid valve SOL1 or the second solenoid valve SOL2, and the fail-safe mode driving by the control of the first and second actuators ACT1 and ACT2 is possible during the failure of the third solenoid valve SOL3 or the fourth solenoid valve SOL4.

Figure 3A:
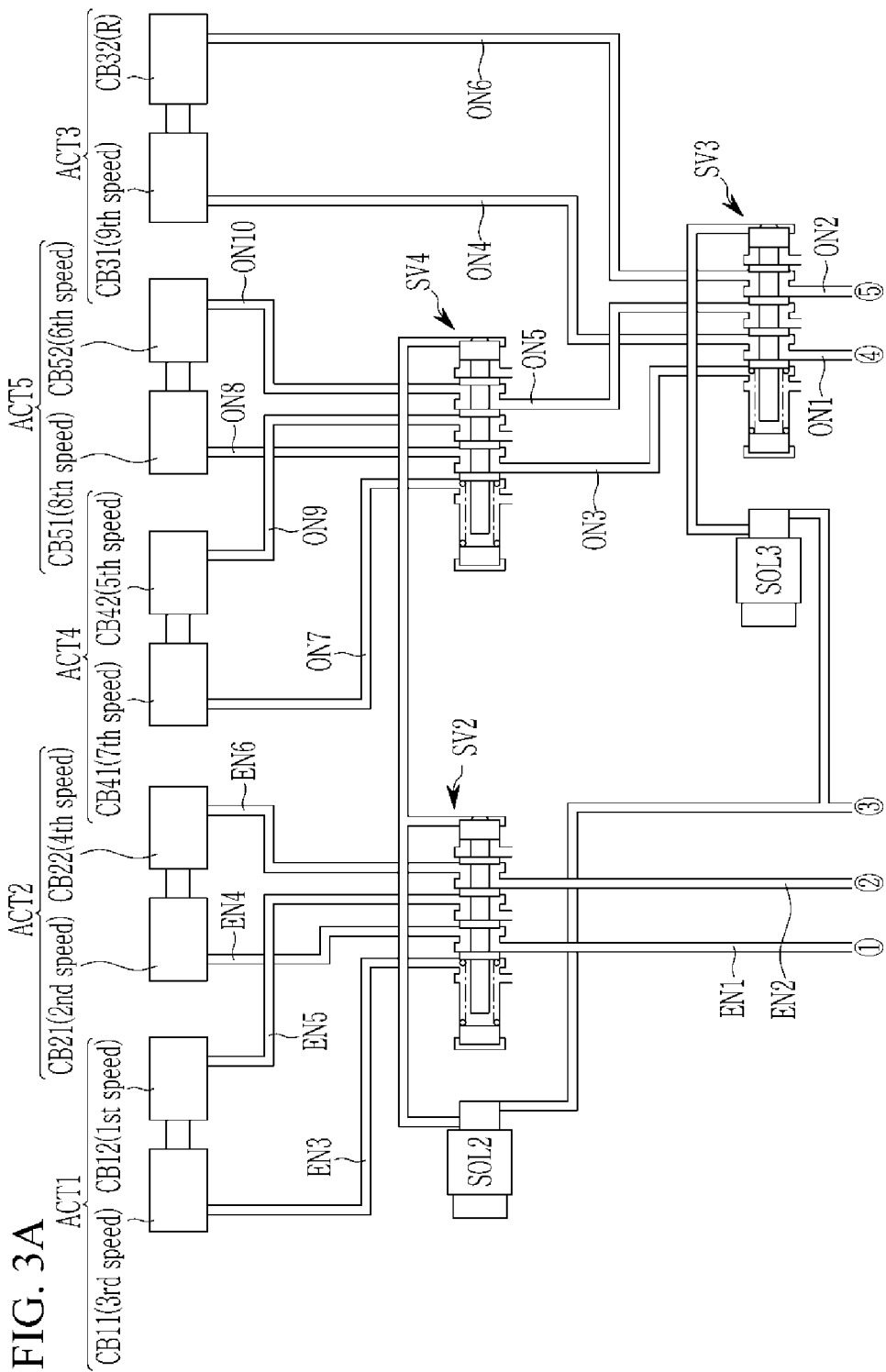
FIG. 3A and FIG. 3B are schematic diagrams of a hydraulic control system of a shift control device of a dual clutch transmission according to various exemplary embodiments of the present invention.
Figure 3B:
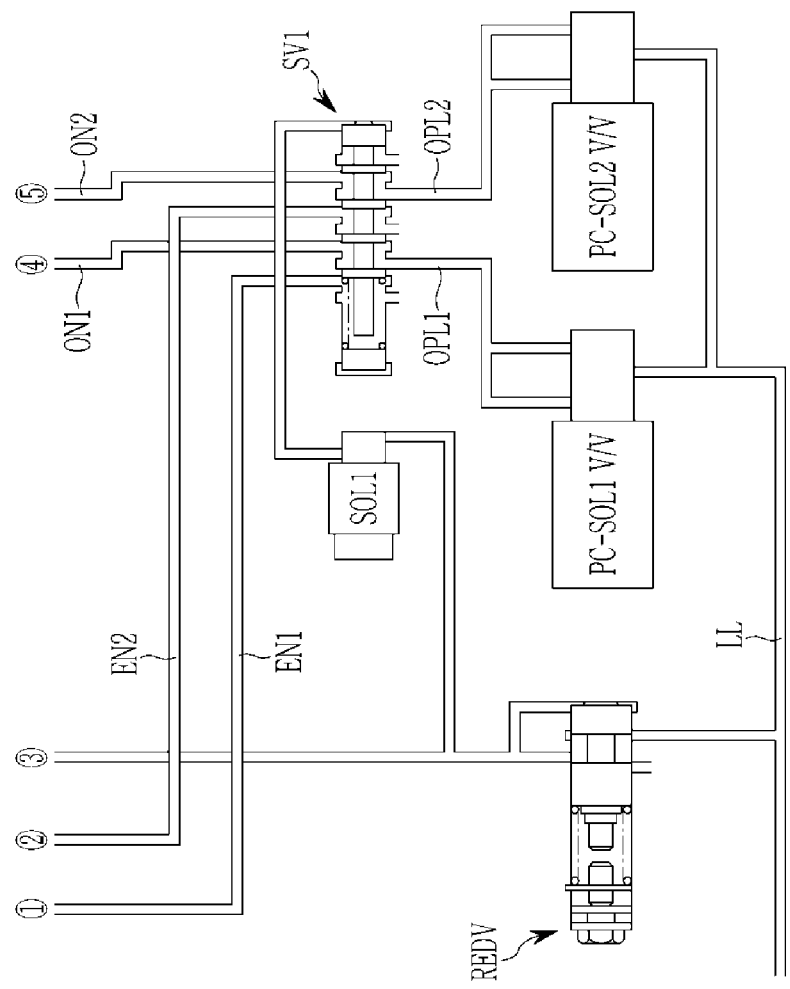

FIG. 3A and FIG. 3B are schematic diagrams of a hydraulic control system of a shift control device of a dual clutch transmission according to various exemplary embodiments of the present invention.

Referring to FIG. 3A and FIG. 3B, in the hydraulic control system of the shift control device of the dual clutch transmission according to the various exemplary embodiments of the present invention, the fourth solenoid valve SOL4 controlling the fourth shift valve SV4 in the various exemplary embodiments is omitted, and the second solenoid valve SOL2 controlling the second shift valve SV2 controls the fourth shift valve SV4.

Also, the first and second chambers CB11 and CB12 of the first actuator ACT1 are the chamber for the shifting of the third speed and the first speed, the first and second chambers CB21 and CB22 of the second actuator ACT2 are the chamber for the shifting of the second speed and the fourth speed, the first and second chambers CB31 and CB32 of the third actuator ACT3 are the chamber for the shifting of the ninth speed and the reverse speed {in the case of eight speed stages, the chamber for the shifting of a neutral speed (N) and the reverse speed (R)}, the first and second chambers CB41 and CB42 of the fourth actuator ACT4 are the chamber for the shifting of the seventh speed and the fifth speed, and the first and second chambers CB51 and CB52 of the fifth actuator ACT5 are the chamber for the shifting of the eighth speed and the sixth speed.

Accordingly, the first solenoid valve SOL1 and the first shift valve SV1 divide the high speed shifting stage and the low speed shifting stage, and the second solenoid valve SOL2 and the second, and fourth shift valve SV2 and SV4 divide the odd-numbered shifting stage and the even-numbered shifting stage.

Also, for the first to fourth shift valves SV1 to SV4, the control pressure of the fourth shift valve SV4 is only changed into the control pressure of the second solenoid valve SOL2 and the other configurations are the same as the various exemplary embodiments such that the detailed description thereof is omitted.

The hydraulic control system of the shift control device of the dual clutch transmission according to the various exemplary embodiments of the present invention may implement the shifting stage of the foreword nine speeds and the reverse one speed while the flow channel of the first to fourth shift valves SV1 to SV4 is converted depending on the independent control of the first and second pressure control solenoid valves PC-SOL1 V/V and PC-SOL2 V/V and the first to third solenoid valves SOL1 to SOL3.

Also, the hydraulic control system of the shift control device of the dual clutch transmission according to the various exemplary embodiments of the present invention may commonly use the shift valve related to the shifting to be configured with the minimum number and the fourth solenoid valve may be omitted, reducing the production cost.

Also, the hydraulic control system of the shift control device of the dual clutch transmission according to the various exemplary embodiments of the present invention is divided into the first and second actuators ACT1 and ACT2 related to the low shifting speed stage, and the third, fourth, and fifth actuators ACT3, ACT4, and ACT5 related to the high shifting speed stage to supply the hydraulic pressure.

Accordingly, the low speed stage or high speed stage driving by the control of the first and second actuators ACT1 and ACT2 or the third, fourth, fifth actuators ACT3, ACT4, and ACT5 may be possible during the failure of the first solenoid valve SOL1. The odd-numbered shifting stage or the even-numbered shifting stage driving by the control of the second, fourth actuator ACT2 and ACT4 or the first, third actuator ACT1 and ACT3 may be possible during the failure of the second solenoid valve SOL2. The odd-numbered shifting stage, or the low speed stage or high speed stage driving by the control of the first and second actuators ACT1 and ACT2 or the first, second, third and fourth actuators ACT1, ACT2, ACT3, and ACT4 may be possible during the failure of the third solenoid valve SOL3.

Figure 4A:
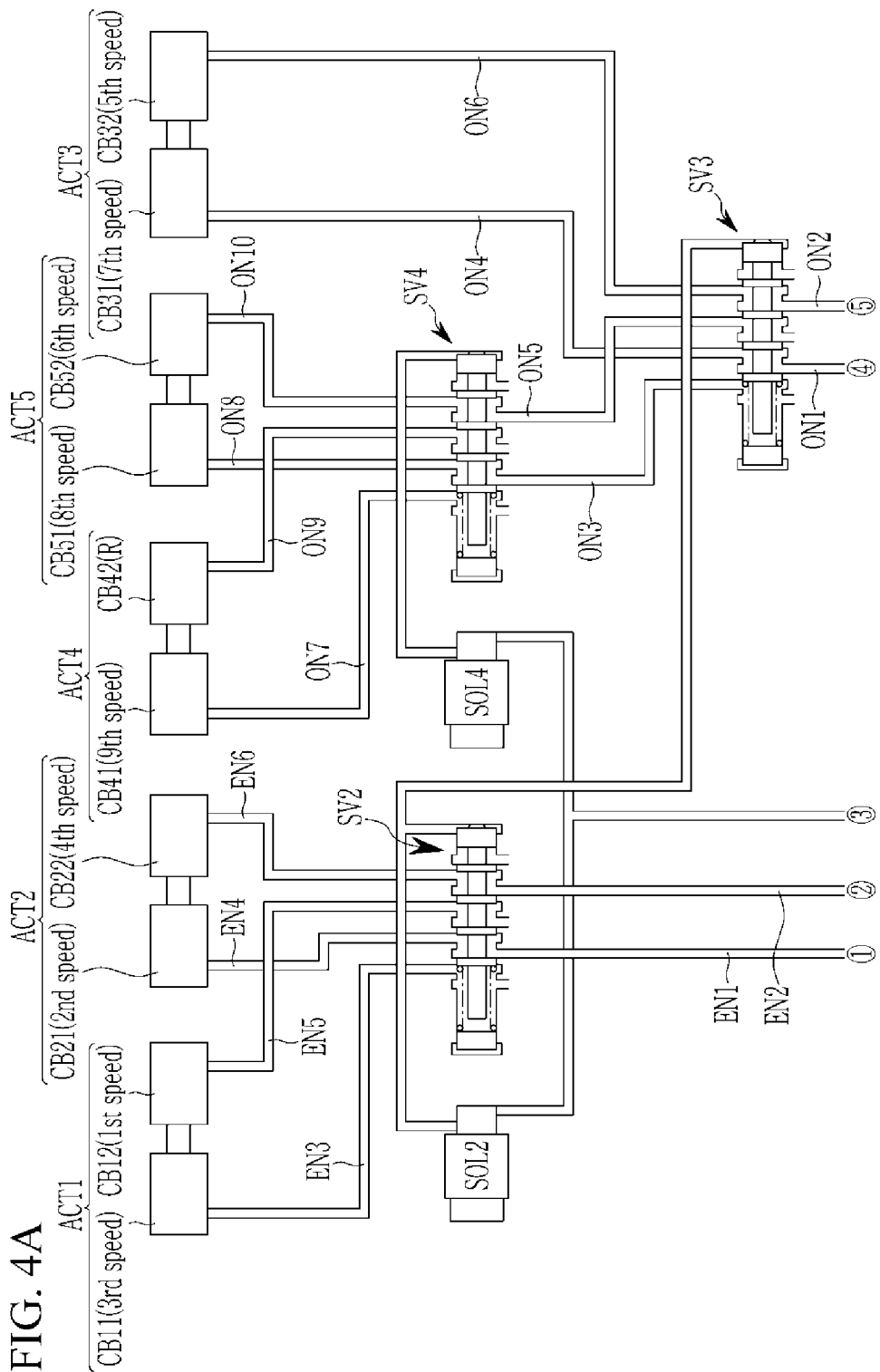
FIG. 4A and FIG. 4B are schematic diagrams of a hydraulic control system of a shift control device of a dual clutch transmission according to various exemplary embodiments of the present invention.
Figure 4B:
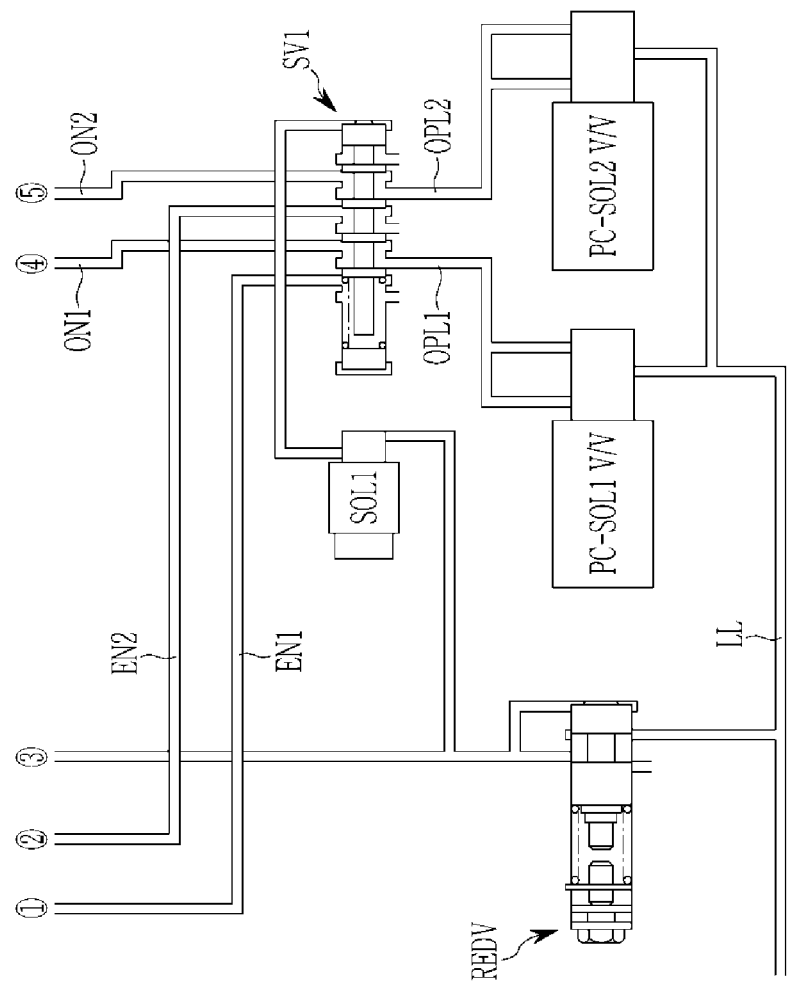

FIG. 4A and FIG. 4B are schematic diagrams of a hydraulic control system of a shift control device of a dual clutch transmission according to various exemplary embodiments of the present invention.

Referring to FIG. 4A and FIG. 4B, in the hydraulic control system of the shift control device of the dual clutch transmission according to the various exemplary embodiments of present invention, the third solenoid valve SOL3 controlling the third shift valve SV3 in the various exemplary embodiments is omitted, and the second solenoid valve SOL2 controlling the second shift valve SV2 may control the third shift valve SV3.

Also, the first and second chambers CB11 and CB12 of the first actuator ACT1 may be the chamber for the shifting of the third speed and the first speed, the first and second chambers CB21 and CB22 of the second actuator ACT2 may be the chamber for the shifting of the second speed and the fourth speed, the first and second chambers CB31 and CB32 of the third actuator ACT3 may be the chamber for the shifting of the seventh speed and the fifth speed, the first and second chambers CB41 and CB42 of the fourth actuator ACT4 may be the chamber for the shifting of the ninth speed and the reverse speed {in the case of the eight speed stages, the neutral speed (N) and the reverse speed (R)}, and the first and second chambers CB51 and CB52 of the fifth actuator ACT5 may be the chamber for the shifting of the eighth speed and the sixth speed.

Accordingly, the first and second actuators ACT1 and ACT2 related to the low speed shifting stage and the third, fourth, and fifth actuators ACT3, ACT4, and ACT5 related to the high speed shifting stage are divided to supply the hydraulic pressure.

Also, the first and fifth actuators ACT1 and ACT5 may realize the odd-numbered shifting stage, and the second and fourth actuators ACT2 and ACT4 may realize the even-numbered shifting stage.

Also, for the first to fourth shift valves SV1 to SV4, the control pressure of the third shift valve SV3 is only changed into the control pressure of the second solenoid valve SOL2 and the rest configurations are the same as the various exemplary embodiments such that the detailed description thereof is omitted.

The hydraulic control system of the shift control device of the dual clutch transmission according to the various exemplary embodiments of the present invention may implement the shifting stages of the foreword nine speeds and one reverse speed while the flow channel of the first to fourth shift valves SV1 to SV4 is converted by the independent control of the first and second pressure control solenoid valves PC-SOL1 V/V and PC-SOL2 V/V and the first and second, fourth solenoid valves SOL1, SOL2, and SOL4.

Also, the hydraulic control system of the shift control device of the dual clutch transmission according to the various exemplary embodiments of the present invention may commonly use the shift valve related to the shifting to be configured with the minimum number and the third solenoid valve may be omitted, reducing the production cost.

Also, in the hydraulic control system of the shift control device of the dual clutch transmission according to the various exemplary embodiments of the present invention, the low speed stage or high speed stage driving by the control of the first and second actuators ACT1 and ACT2 or the third, fourth, and fifth actuators ACT3, ACT4, and ACT5 may be possible during the failure of the first solenoid valve SOL1. The odd-numbered shifting stage or even-numbered shifting stage driving by the control of the second, third actuators ACT2 and ACT3 or the first, fourth, and fifth actuators ACT1, ACT4, and ACT5 may be possible during the failure of the second solenoid valve SOL2. The odd-numbered shifting stage or low gear and high gear driving by the control of the first and second actuators ACT1 and ACT2 or the first, second, third and fourth actuators ACT1, ACT2, ACT3, and ACT4 may be possible during the failure of the fourth solenoid valve SOL4.

Figure 5A:
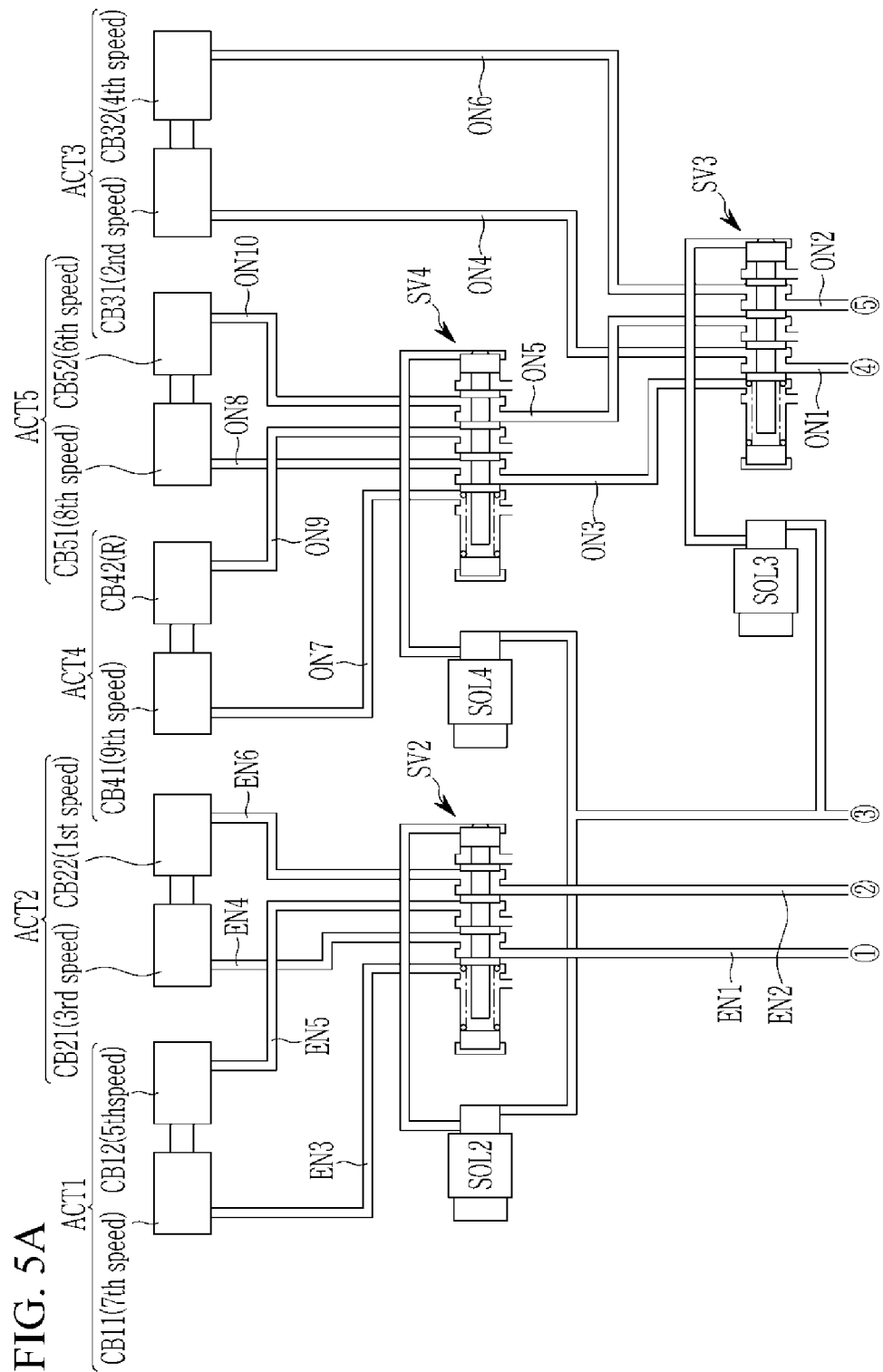
FIG. 5A and FIG. 5B are schematic diagrams of a hydraulic control system of a shift control device of a dual clutch transmission according to various exemplary embodiments of the present invention.
Figure 5B:
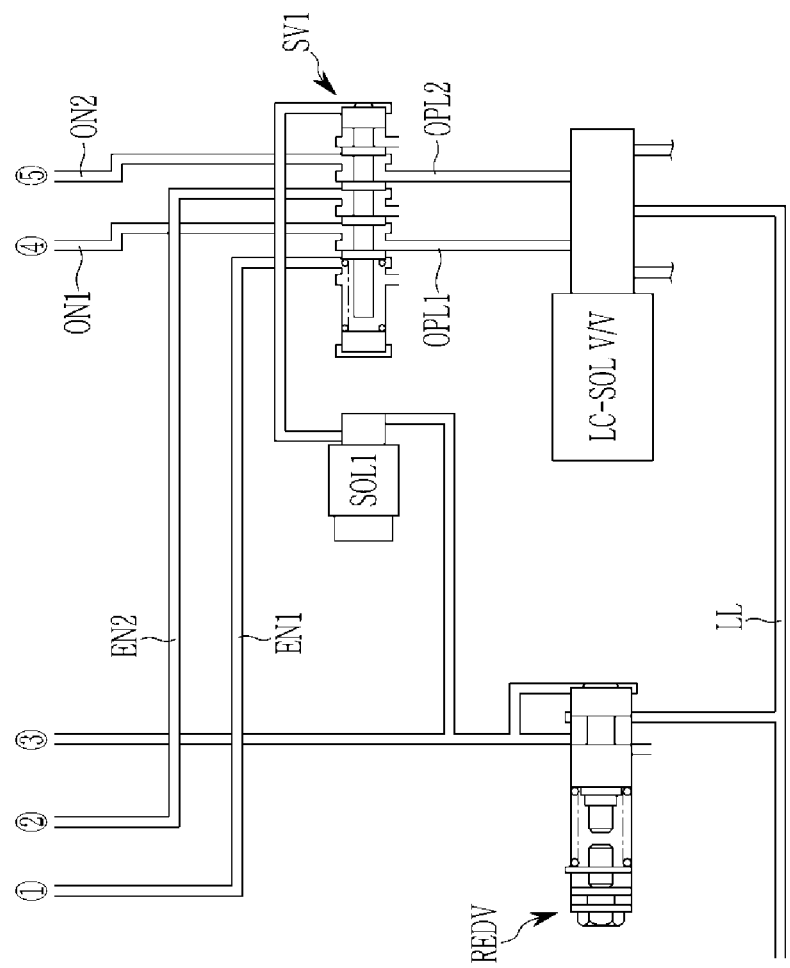

FIG. 5A and FIG. 5B are schematic diagrams of a hydraulic control system of a shift control device of a dual clutch transmission according to various exemplary embodiments of the present invention.

Referring to FIG. 5A and FIG. 5B, in the hydraulic control system of the shift control device of the dual clutch transmission according to the various exemplary embodiments of the present invention, the first and second pressure control solenoid valves PC-SOL1 V/V and PC-SOL2 V/V applied as the control valve in the various exemplary embodiments are omitted and one flow rate control solenoid valve LC-SOL V/V is applied to variably control the flow rate of the line pressure supplied through the line pressure flow channel LL, selectively controlling the supply of the first ejection flow channel OPL1 and the second ejection flow channel OPL2.

In the various exemplary embodiments of the present invention, one flow rate control solenoid valve LC-SOL V/V is changed instead of the first and second pressure control solenoid valves PC-SOL1 V/V and PC-SOL2 V/V and the other configurations are the same as the various exemplary embodiments such that the detailed description is omitted.

The hydraulic control system of the shift control device of the dual clutch transmission according to the various exemplary embodiments of the present invention may implement the shifting stages of the foreword nine speeds and one reverse speed while the flow channel of the first to fourth shift valves SV1 to SV4 is converted depending on the independent control of the flow rate control solenoid valves LC-SOL V/V and the first and second, third, and fourth solenoid valves SOL1, SOL2, SOL3, and SOL4.

Also, as the hydraulic control system of the shift control device of the dual clutch transmission according to the various exemplary embodiments of the present invention selectively supplies and controls the hydraulic pressure to the first ejection flow channel OPL1 and the second ejection flow channel OPL2 by the method variably controlling the flow rate of the line pressure through one flow rate control solenoid valve LC-SOL V/V, the constituent elements may be minimized, reducing the production cost.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A hydraulic control system of a shift control device for a dual clutch transmission, the hydraulic control system comprising:
a control valve variably controlling a line pressure supplied through a line pressure flow channel to be selectively supplied to a first ejection flow channel and a second ejection flow channel;
a first shift valve converting a flow channel to supply a hydraulic pressure of the control valve supplied through the first and second ejection flow channels to a lower stream side through two paths, respectively;
a second shift valve converting a flow channel to selectively supply the hydraulic pressure of the first ejection flow channel supplied from the first shift valve to a first chamber of a first actuator and a first chamber of a second actuator and to selectively supply the hydraulic pressure of the second ejection flow channel supplied from the first shift valve to a second chamber of the first actuator and a second chamber of the second actuator;
a third shift valve converting a flow channel to selectively supply the hydraulic pressure of the first ejection flow channel supplied from the first shift valve to a lower stream side thereof and a first chamber of a third actuator and to selectively supply the hydraulic pressure of the second ejection flow channel supplied from the first shift valve to a lower stream side thereof and a second chamber of the third actuator; and
a fourth shift valve converting a flow channel to selectively supply the hydraulic pressure of the first ejection flow channel supplied from the third shift valve to a first chamber of a fourth actuator and a first chamber of a fifth actuator and to selectively supply the hydraulic pressure of the second ejection flow channel supplied from the first shift valve to a second chamber of the fourth actuator and a second chamber of the fifth actuator,
wherein the first, second, third and fourth shift valves are respectively and independently controlled by first, second, third and fourth solenoid valves on/off-controlling the hydraulic pressure supplied from a reducing valve controlling the line pressure into the hydraulic pressure to be further smaller and stable.

2. The hydraulic control system of the shift control device for the dual clutch transmission of claim 1, wherein the control valve includes:
a first pressure control solenoid valve variably controlling the pressure of the line pressure supplied through the line pressure flow channel to be supplied to the first ejection flow channel, and
a second pressure control solenoid valve variably controlling the pressure of the line pressure supplied through the line pressure flow channel to be supplied to the second ejection flow channel.

3. The hydraulic control system of the shift control device for the dual clutch transmission of claim 1, wherein the control valve is one flow rate control solenoid valve variably controlling the flow rate of the line pressure supplied through the line pressure flow channel to be selectively supplied to the first ejection flow channel and the second ejection flow channel.

4. The hydraulic control system of the shift control device for the dual clutch transmission of claim 1, wherein
the first and second, fourth actuators are configured to control odd-numbered shifting stage and a reverse speed, and
the third and fifth actuator are configured to control even-numbered shifting stage.

5. The hydraulic control system of the shift control device for the dual clutch transmission of claim 1, wherein
the first and second chambers of the first actuator are the chamber for the shifting of a seventh speed and a fifth speed,
the first and second chambers of the second actuator are the chamber for the shifting of a third speed and a first speed,
the first and second chambers of the third actuator are the chamber for the shifting of a second speed and a fourth speed,
the first and second chambers of the fourth actuator are the chamber for the shifting of a ninth speed and a reverse speed, and
the first and second chambers of the fifth actuator are the chamber for the shifting of an eighth speed and a sixth speed.

6. The hydraulic control system of the shift control device for the dual clutch transmission of claim 1, wherein
a fail-safe mode driving by the control of the third, fourth, and fifth actuators is performed during a failure of the first solenoid valve or the second solenoid valve,
a fail-safe mode driving by the control of the first and second actuators is performed during a failure of the third solenoid valve or the fourth solenoid valve.

7. The hydraulic control system of the shift control device for the dual clutch transmission of claim 1, wherein
the first shift valve is a spool valve including a valve body and a valve spool disposed in the valve body and converts the flow channel while being controlled by an elastic member disposed at a side end portion thereof and the control pressure of the first solenoid valve acted on an opposite side thereof to correspond to an elastic force of the elastic member.

8. The hydraulic control system of the shift control device for the dual clutch transmission of claim 7, wherein
the valve body of the first shift valve includes a first port receiving a control pressure of the first solenoid valve, a second port receiving a hydraulic pressure of the first ejection flow channel, a third port selectively supplying the hydraulic pressure supplied to the second port to a first odd-numbered stage flow channel, a fourth port selectively supplying the hydraulic pressure supplied to the second port to a first even-numbered stage flow channel, a fifth port receiving the hydraulic pressure of the second ejection flow channel, a sixth port selectively supplying the hydraulic pressure supplied to the fifth port to a second odd-numbered stage flow channel, a seventh port selectively supplying the hydraulic pressure supplied to the fifth port to a second even-numbered stage flow channel, and three exhaust ports respectively exhausting the hydraulic pressure supplied to the third, fourth, and sixth, the seventh ports, and
the valve spool of the first shift valve includes a first land selectively connecting the second port and the third port, a second land selectively connecting the second port and the fourth port along with the first land, a third land selectively connecting the fifth port and the sixth port, a fourth land selectively connecting the second port and the seventh port along with the third land, a fifth land acted with the control pressure of the first solenoid valve, and an elastic member disposed between the first land and the valve body.

9. The hydraulic control system of the shift control device for the dual clutch transmission of claim 1, wherein the second shift valve is a spool valve including a valve body and a valve spool disposed in the valve body and converts the flow channel while being controlled by an elastic member disposed at a side end portion thereof and the control pressure of the second solenoid valve acted on an opposite side thereof to correspond to the elastic force of the elastic member.

10. The hydraulic control system of the shift control device for the dual clutch transmission of claim 9, wherein
the valve body of the second shift valve includes a first port receiving the control pressure of the second solenoid valve, a second port receiving the hydraulic pressure of a first odd-numbered stage flow channel, a third port selectively supplying the hydraulic pressure supplied to the second port to a third odd-numbered stage flow channel, a fourth port selectively supplying the hydraulic pressure supplied to the second port to a fourth odd-numbered stage flow channel, a fifth port receiving the hydraulic pressure of a second odd-numbered stage flow channel, a sixth port selectively supply the hydraulic pressure supplied to a fifth port to the fifth odd-numbered stage flow channel, a seventh port selectively supplying the hydraulic pressure supplied to the fifth port to a sixth odd-numbered stage flow channel, and three exhaust ports exhausting the hydraulic pressure supplied to the third, fourth, sixth, and seventh ports, and
the valve spool of the second shift valve includes a first land selectively connecting the second port and the third port, a second land selectively connecting the second port and the fourth port along with the first land, a third land selectively connecting the fifth port and the sixth port, a fourth land selectively connecting the second port and the seventh port along with the third land, a fifth land acted with the control pressure of the second solenoid valve, and an elastic member disposed between the first land and the valve body.

11. The hydraulic control system of the shift control device for the dual clutch transmission of claim 1, wherein
the third shift valve is a spool valve including a valve body and a valve spool disposed in the valve body and converts the flow channel while being controlled by an elastic member disposed at a side end portion thereof and the control pressure of the third solenoid valve acted on an opposite side thereof to correspond to the elastic force of the elastic member.

12. The hydraulic control system of the shift control device for the dual clutch transmission of claim 11, wherein
the valve body of the third shift valve includes a first port receiving the control pressure of the third solenoid valve, a second port receiving the hydraulic pressure of a first even-numbered stage flow channel, a third port selectively supplying the hydraulic pressure supplied to the second port to a third even-numbered stage flow channel, a fourth port selectively supplying the hydraulic pressure supplied to the second port to a fourth even-numbered stage flow channel, a fifth port receiving the hydraulic pressure of a second even-numbered stage flow channel, a sixth port selectively supplying the hydraulic pressure supplied to the fifth port to a fifth even-numbered stage flow channel, a seventh port selectively supplying the hydraulic pressure supplied to the fifth port to a sixth even-numbered stage flow channel, and three exhaust ports respectively exhausting the hydraulic pressure supplied to the third, fourth, sixth, and seventh ports; and the valve spool of the third shift valve includes a first land selectively connecting the second port and the third port, a second land selectively connecting the second port and the fourth port along with the first land, a third land selectively connecting the fifth port and the sixth port, a fourth land selectively connecting the second port and the seventh port along with the third land, a fifth land acted with the control pressure of the third solenoid valve, and an elastic member disposed between the first land and the valve body.

13. The hydraulic control system of the shift control device for the dual clutch transmission of claim 1, wherein the fourth shift valve is a spool valve including a valve body and a valve spool disposed in the valve body and converts the flow channel while being controlled by an elastic member disposed at a side end portion thereof and the control pressure of the fourth solenoid valve acted on the opposite side thereof to correspond to elastic force of an elastic member.

14. The hydraulic control system of the shift control device for the dual clutch transmission of claim 13, wherein a valve body of the fourth shift valve includes a first port receiving the control pressure of the fourth solenoid valve, a second port receiving the hydraulic pressure of a third even-numbered stage flow channel, a third port selectively supplying the hydraulic pressure supplied to the second port to a seventh even-numbered stage flow channel, a fourth port selectively supplying the hydraulic pressure supplied to the second port to an eighth even-numbered stage flow channel, a fifth port receiving the hydraulic pressure of a fifth even-numbered stage flow channel, a sixth port selectively supplying the hydraulic pressure supplied to the fifth port to a ninth even-numbered stage flow channel, a seventh port selectively supplying the hydraulic pressure supplied to the fifth port to a tenth even-numbered stage flow channel, and three exhaust ports respectively exhausting the hydraulic pressure supplied to the third, fourth, sixth, and seventh ports, and the valve spool of the fourth shift valve includes a first land selectively connecting the second port and the third port, a second land selectively connecting the second port and the fourth port along with the first land, a third land selectively connecting the fifth port and the sixth port, a fourth land selectively connecting the second port and the seventh port along with the third land, a the fifth land acted with the control pressure of the fourth solenoid valve, and an elastic member disposed between the first land and the valve body.

15. The hydraulic control system of the shift control device for the dual clutch transmission of claim 1, wherein the second solenoid valve is connected to the flow channel to simultaneously control the second shift valve and the fourth shift valve.

16. The hydraulic control system of the shift control device for the dual clutch transmission of claim 15, wherein the first and second chambers of the first actuator are a chamber for the shifting of a third speed and a first speed, the first and second chambers of the second actuator are a chamber for the shifting of a second speed and a fourth speed, the first and second chambers of the third actuator are a chamber for the shifting of a ninth speed and a reverse speed, the first and second chambers of the fourth actuator are a chamber for the shifting of a seventh speed and a fifth speed, and the first and second chambers of the fifth actuator are the chamber for the shifting of an eight speed and a sixth speed.

17. The hydraulic control system of the shift control device for the dual clutch transmission of claim 15, wherein the driving of a low speed stage or a high speed stage by the control of the first and second actuators or the third, fourth, and fifth actuators is performed during the failure of the first solenoid valve, the driving of odd-numbered shifting stage or even-numbered shifting stage by the control of the second and fourth actuators or the first and third actuators is performed during the failure of the second solenoid valve, and the driving of the odd-numbered shifting stage or low gear and high gear by the control of the first and second actuators or the first, second, third and fourth actuators is performed during the failure of the third solenoid valve.

18. The hydraulic control system of the shift control device for the dual clutch transmission of claim 1, wherein the second solenoid valve is connected to the flow channel to simultaneously control the second shift valve and the third shift valve.

19. The hydraulic control system of the shift control device for the dual clutch transmission of claim 18, wherein the first and second chambers of the first actuator are the chamber for the shifting of a third speed and a first speed, the first and second chambers of the second actuator are the chamber for the shifting of a second speed and a fourth speed, the first and second chambers of the third actuator are the chamber for the shifting of a seventh speed and a fifth speed, the first and second chambers of the fourth actuator are the chamber for the shifting of a ninth speed and a reverse speed, and the first and second chambers of the fifth actuator are the chamber for the shifting of an eighth speed and a sixth speed.

20. The hydraulic control system of the shift control device for the dual clutch transmission of claim 18, wherein the driving of a low gear or a high gear by the control of the first and second actuators or the third, fourth, and fifth actuators is performed during the failure of the first solenoid valve, the driving of odd-numbered shifting stage or even-numbered shifting stage by the control of the second and third actuators or the first, fourth, and fifth actuators is performed during the failure of the second solenoid valve, and the driving of the odd-numbered shifting stage or the low gear and the high gear by the control of the first and second actuators or the first, second, third and fourth actuators is performed during the failure of the fourth solenoid valve.

\* \* \* \* \*